US007038682B2

(12) United States Patent
Ananya (10) Patent No.: US 7,038,682 B2
(45) Date of Patent: *May 2, 2006

(54) COMPUTER CURVE CONSTRUCTION SYSTEM II

(76) Inventor: Brigit Ananya, 20725 Locust Dr., Los Gatos, CA (US) 95033

( * ) Notice: Subject to any disclaimer, the term of this patent is extended or adjusted under 35 U.S.C. 154(b) by 0 days.

This patent is subject to a terminal disclaimer.

(21) Appl. No.: 10/700,408

(22) Filed: Nov. 3, 2003

(65) Prior Publication Data

US 2004/0095351 A1    May 20, 2004

Related U.S. Application Data

(60) Provisional application No. 60/424,097, filed on Nov. 5, 2002.

(51) Int. Cl.
*G06T 11/20* (2006.01)

(52) U.S. Cl. .................................. 345/442; 345/441

(58) Field of Classification Search ................ 345/422, 345/441–442
See application file for complete search history.

(56) References Cited

OTHER PUBLICATIONS

"Advanced Animation and Rebdering Techniques", Watt, ISBN 0-201-54412-1, 1992.*
"From Conics to NURBS: A Tutorial Survey", Farin, IEEE Computer Graphics and Applications, 1992.*

* cited by examiner

*Primary Examiner*—Michael Razavi
*Assistant Examiner*—Eric Woods
(74) *Attorney, Agent, or Firm*—David E. Newhouse, Esq (57) ABSTRACT

An invented computer curve construction system is described that enables construction of conics more intuitively, predictably, and accurately. Also new constructions of particular cubic Bezier curves and their conic analogs are described.

15 Claims, 6 Drawing Sheets

COMPUTER CURVE CONSTRUCTION SYSTEM II

RELATED APPLICATIONS

Provisional Application, No. 60/424,097, filed Nov. 5, 2002, by Brigit Ananya for "Computer Curve Construction System II".

BACKGROUND OF THE INVENTION

1. Field of the Invention

This invention relates generally to computer curve construction systems and methods. In particular, it describes additional embodiments of a "Computer Curve Construction System" described in U.S. Pat. No. 6,441,823, Ananya, where the chosen curves are conical sections.

2. Description of Related Art

Figure 1:
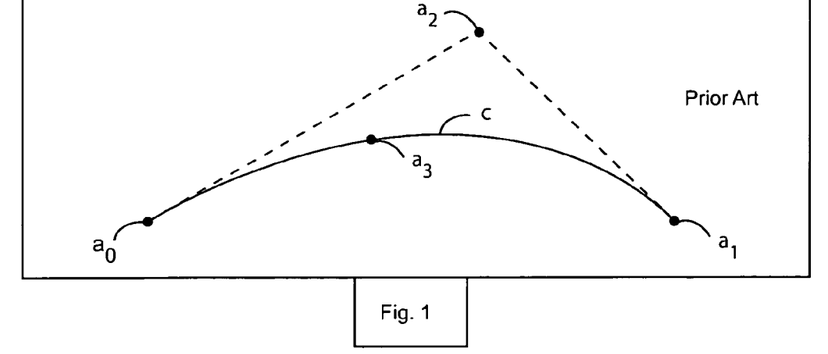
FIG. 1 is all the steps in constructing a conic the old way
Figure 2:
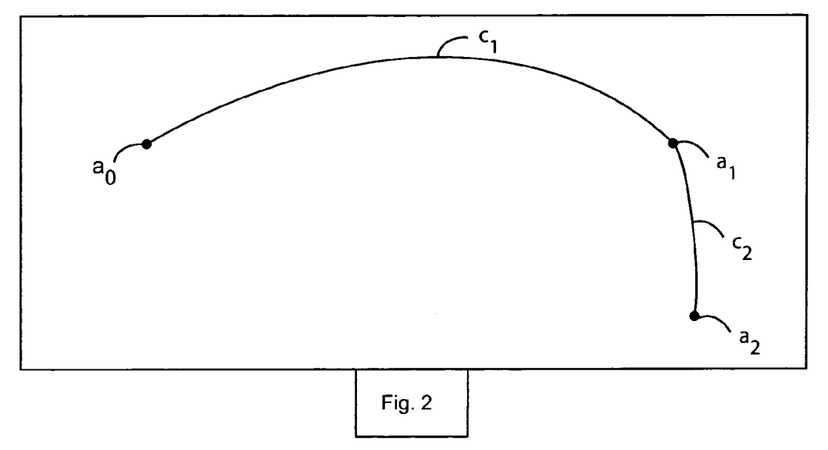
FIG. 2 is two curves connected without curvature continuity
Figure 3:
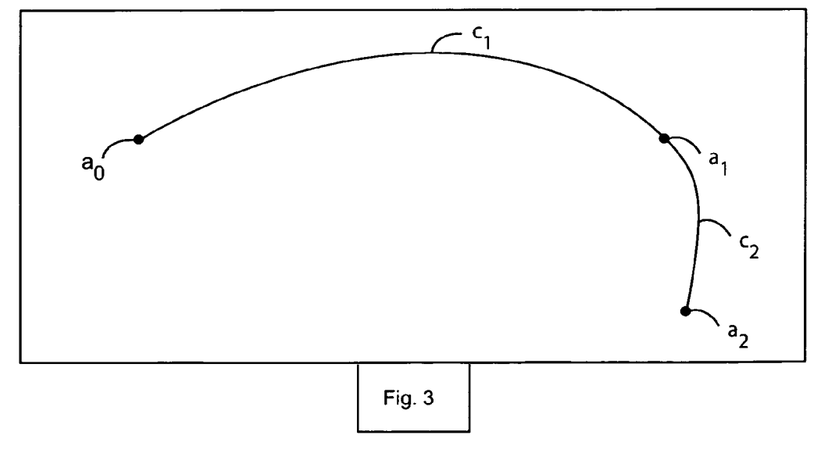
FIG. 3 is two curves connected with curvature continuity

A conic is a mathematically defined curve. For example, as shown in FIG. 1, typically a conic it is drawn (constructed) with a computer curve drawing program by setting a start point $a_0$, an end point $a_1$, and a control point $a_2$, and then choosing any arbitrary point $a_3$ on the conic. The tangent directions of the conic are determined by the control point $a_2$, and the shape of the conic is determined by the chosen arbitrary point $a_3$. However, simply choosing an arbitrary point $a_3$ that will be somewhere on the conic does not allow a program operator to intuitively anticipate the shape of the conic that will be constructed by the computer.

In contrast, U.S. Pat. No. 6,441,823, Ananya, B., describes a computer curve construction system for creating peak-point curves by selecting a star point, a start tangent direction, an end point spaced from the start point, an end tangent direction, and a peak point somewhere between the start and end points where the program calculates and draws a curve connecting the start and end points passing through the peak point where the tangent of the curve at the peak point is parallel to the chord between the start and end points. [See claims 13, 14, 15, & 16, Col. 24 ll 7–54.] By defining a peak point, the curve construction system described in Ananya enables the operator to better anticipate, intuitively, the shape of the curve the program will construct responsive to operator input.

Conical section or conics have the advantage of being generally more geometric than Bezier curves. This geometric feature allows for easier operator conceptualization of a contemplated curve before inputting defining parameters. Secondly, behavior of conics are computationally predictable with established relationships that exist or can be easily defined. Yet for formulations and accurate numeric approximations by a computer (CPU) constructing the conic, the defining signature constraints on the operator selected parameters must satisfy particular conditions before the computer program can allow construction of a desired curve.

SUMMARY OF THE INVENTION

An invented computer curve construction system is described that enables construction of conics more intuitively, predictably, and accurately. Also new constructions of particular cubic Bezier curves and their conic analogs are described.

As in Ananya (supra) the newly invented computer curve constructions allow curves that consist of several curve components connected either with $G^0$ continuity, i.e. continuity of points (geometric continuity of order 0), $G^1$ continuity, i.e. continuity of points and tangent directions, just the angles of the tangents, (geometric continuity of order 1), or $G^2$ continuity, i.e. continuity of points, tangent directions, and curvatures (geometric continuity of order 2).

In a first embodiment, construction of a conic peak-point curve is described where the operator inputs are:
  (i) the start point, $a_0$;
  (ii) the end point, $a_1$;
  (iii) the start tangent direction, $e_0$;
  (iv) the end tangent directions, $e_1$; and
  (v) the distance of the peak point, p from the chord between the start and end points.

The peak point is the point on the curve that is farthest away from the chord sometimes referred to as the shoulder point of the curve. For conics the peak point always lies on the centerline segment connecting the center of the chord with the intersection point t of the rays extending in the start and end tangent directions $e_0$, $e_1$ respectively from the start and end points $a_0$, $a_1$ [hereinafter referred to as start and end tangents].

In a second embodiment, construction of a conic point-point curve is described where the operator inputs are:
  (i) the start point, $a_0$;
  (ii) the start tangent direction, $e_0$; and
  (iii) the peak point, p.

From these inputs, the computer system displays a guide area locating possible end point loci. The guide area is defined by 2 rays intersecting at a point s that lies on a one of the 2 rays that extends from the start point $a_0$ in the direction of the peak point p at twice (2×) the distance of the peak point p from the start point $a_0$. The other ray extends from s in the direction opposite to the start tangent direction $e_0$.
  (iv) The operator then selects any point in the guide area as the end point $a_1$ of the curve.

The computer, using any suitable mathematical formulae then constructs a curve passing through the start point, $a_0$, peak point, p, and the end point $a_1$. The end point tangent direction $e_1$ is derived from the known point of intersection of the start and end tangents coinciding with the intersection of start tangent and the line connecting the center of the chord between the start and end points $a_0$, $a_1$, and the peak point, p.

In a third embodiment, construction of a conic point-tangent curve is described wherein the operator inputs are:
  (i) the start point, $a_0$;
  (ii) the start tangent direction, $e_0$;
  (iii) the end point, $a_1$;
  (iv) the end point tangent directions, $e_1$; and
  (v) a fixed weight, w, or fixed cos-weight, v, for the curve.

The computer, using any suitable mathematical formulae, then constructs a curve passing through the start point, $a_0$, and the end point $a_1$. The input weight w is a parameter defined as the proportion between the distance of a peak point from the center point q of the chord between the start and end points $a_0$, $a_1$ and the distance of the peak point from the intersection point t of the start and end tangents. Accordingly, the input weight w chosen for the curve locates the peak point on the centerline segment connecting q with t. In this construction system, a fixed cos-weight v is an arbitrarily defined positive parameter that utilizes a multiplication factor such as the trigonometric cosine relationship for computing a weight that limits the permitted range of the peak points of the possible curves. For example, when the angle α between the start and end tangent directions, $e_0$, $e_1$, is set by operator input near 180°, the height of a fixed weight curve (the locus of the peak point p) approaches infinity as $\alpha$ approaches 180°, whereas the height of a fixed cos-weight curve is limited as a approaches 180°, e.g., if the fixed cos-weight v utilizes a factor $\cos(\alpha/2)$ for computing the weight w, which approaches zero as $\alpha \to 180°$, the loci of the peak points for the possible curves approaches a limit.

In a fourth embodiment, construction of a conic point curve is described wherein the operator inputs are:
(i) the start point, $a_0$;
(ii) the start tangent direction, $e_0$; and
(iii) the end point, $a_1$, and
(iv) a fixed weight, w, or fixed cos-weight, v, for the curve The computer, using any suitable mathematical formulae, then constructs a curve passing through the start point, $a_0$, and the end point $a_1$, where the end tangent direction $e_1$ is automatically set, e.g. in a symmetric way such that the angle between a ray extending from the start point $a_0$ in the direction of the end point $a_1$, and the end tangent direction, $e_1$, equals the angle of between the start tangent direction, $e_0$ and that ray. As in the case of the conic point-tangent curve, the chosen weight w or cos-weight v locates the peak point, p on the centerline segment between the center point of the chord and the intersection point t of the start and end tangents.

There are essentially infinite possible conic point-tangent curve constructions, and, as well, infinite possible conic point curve constructions because of the possible weights, w, or cos-weights, v, that can be selected by an operator. The invented concept of using a fixed weight w or a fixed cos-weight v is also applicable to cubic Bezier curves and many other curve classes. By choosing to place the peak point p on the centerline segment connecting the center of the chord between the start and end points with the intersection point of the start and end tangents, the selected weight w or cos-weight v determines the position of the peak point.

In a fifth embodiment, construction of a conic curvature curve is described where the operator inputs are:
(i) the start point, $a_0$;
(ii) the start tangent direction, $e_0$; whereupon the computer displays a guideline perpendicular to the start tangent direction, $e_0$ for the center $m_0$ of the start curvature circle, $r_0$;
(iii) the center $m_0$ of the start curvature circle $r_0$ on the displayed guideline; and
(iv) the end point $a_1$; and
(v) the end tangent direction, $e_1$.

For conic curvature curves, the start curvature determines the end curvature. The computer, using any suitable mathematical formulae, then establishes a center $m_1$ for the end curvature circle $r_1$ and draws a conic curve through the start and end points $a_0$, $a_1$, with respective start and end tangent directions of $e_0$, $e_1$ with the center $m_0$ of the start curvature circle $r_0$.

In a sixth embodiment, a construction system for a new class of point curvature curves including those for cubic Bezier curves and conics is described where the operator inputs are:
(i) the start point, $a_0$;
(ii) the start tangent direction, $e_0$; whereupon the computer displays a guideline perpendicular to the start tangent direction, $e_0$ for the center $m_0$ of the start curvature circle $r_0$;
(iii) the center $m_0$ of the start curvature circle $r_0$ on the displayed guideline; and
(vi) the end point $a_1$.

The computer, using any suitable mathematical formulae, then constructs a curve passing through the start and end points $a_0$, $a_1$, with start tangent direction $e_0$ and center $m_0$ of the start curvature circle $r_0$. In this embodiment, like the previously described conic point curve construction embodiment, the end tangent direction $e_1$ is automatically set, e.g. in a symmetric way such that the angle between a ray extending from the start point $a_0$ in the direction of the end point $a_1$, and the end tangent direction, $e_1$, equals the angle of between the start tangent direction, $e_0$ and that ray. For conics, the center $m_1$ of the end curvature circle $r_1$ is automatically determined as shown for conic curvature curves. Since the end tangent direction is chosen in a symmetric way, the end curvature of the resulting conic equals the start curvature. For cubic Bezier curves, the center $m_1$ of the end curvature circle $r_1$ must be chosen by the program, e.g., in such a way that the end curvature equals the start curvature.

As described in Ananya (supra), it is possible to modify a curve by changing the position of a feature of any curve component while drawing it or after the drawing is completed. It is also possible to modify the type of continuity by which two curve components are connected, or to make two curves out of one curve, or one curve out of two curves, to delete and redraw any curve component, or to add or subtract curve components.

Last but not least it is possible to change the curve type. In particular, it is possible to transform a conic into one or several cubic Bezier curves (which are very close) and to transform a cubic Bezier curve into one or several conics (which are fairly close, but are chosen in such a way that allows for shape improvement).

This invented Computer Curve Construction System II enables the construction of conics more intuitively, predictably, and accurately, and it is also faster, more efficient and ergonomic for the operator.

DETAILED DESCRIPTION OF THE INVENTION

Introduction

The present computer curve construction system and method is preferably implemented as part of a computer drawing program for drawing curves, which is a practical application in the industrial art of computer drawing. In one embodiment, the system may be implemented in any suitable computer language for any operating system and any hardware platform. The system may be distributed through any medium, such as a disc, non-volatile memory, or being available for downloading on a network. In other embodiments the system may be implemented in any firmware or any hardware.

In FIGS. 1–19, all points are represented by small circles, and all tangent directions are represented by lines with arrows. A tangent direction only indicates the direction or angle of a tangent vector; it does not indicate the length of the tangent vector.

The Computer Curve Construction System described in Ananya (supra) is incorporated by reference into this application to provide definition, context and meaning to the newly invented curve construction embodiments described below.

Figure 4:
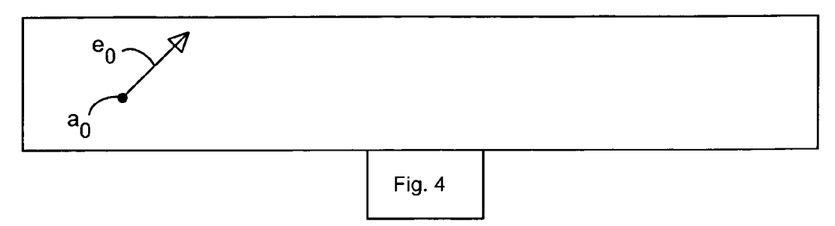
FIG. 4 is a first step in constructing a conic peak-point curve.
Figure 5:
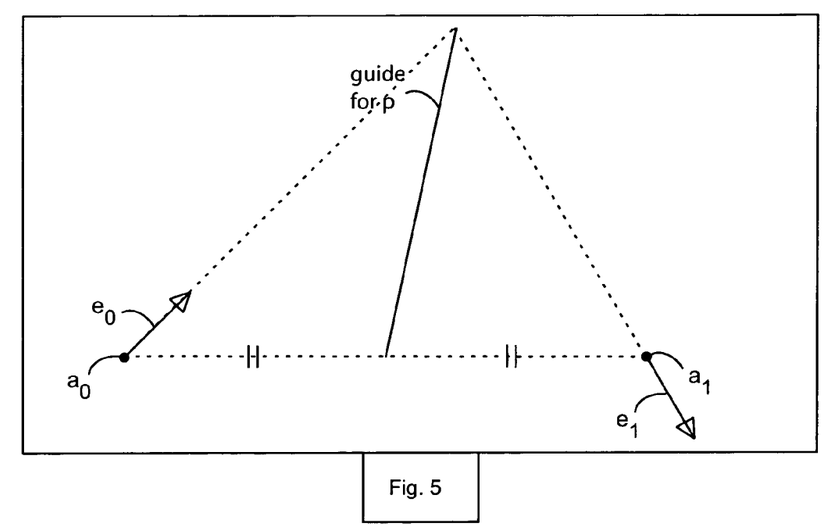
FIG. 5 is a second step in constructing a conic peak-point curve.
Figure 6:
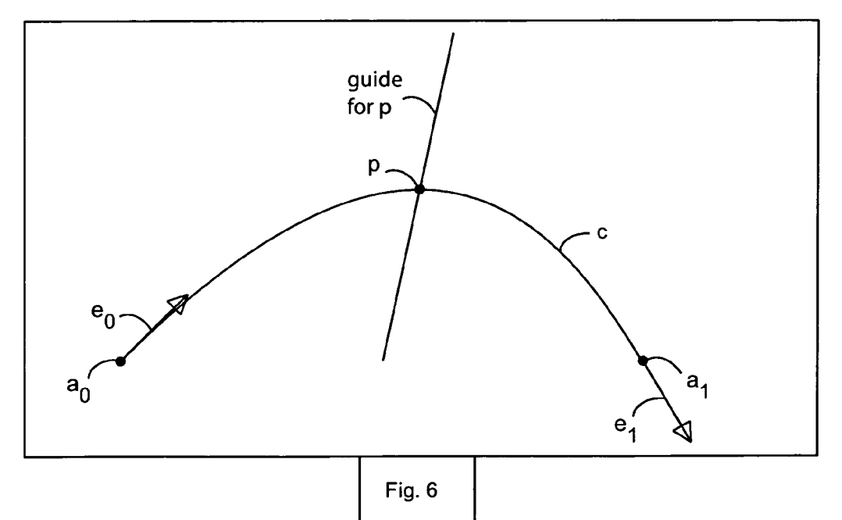
FIG. 6 is a third step in constructing a conic peak-point curve.

FIGS. 4–6—Conic Peak-Point Curves

As in Ananya (supra), in a first step shown in FIG. 4, a start point $a_0$ is set, and a start tangent direction $e_0$ is set. In a second step shown in FIG. 5, an end point $a_1$ is set and an end tangent direction $e_1$ is set. Then a guide for the peak point is shown (the point on the curve at the greatest distance from the chord). The guide for the peak point is the centerline segment which connects the center of the chord with the intersection point of the start and end tangents. For a conic the peak always lies on the centerline segment. In a third step shown in FIG. 6, the peak point p is set anywhere on this guide. Since it is difficult to place p exactly on the guide, the point that is set is projected onto the guide to the point on the guide at the same distance from the chord. A conic curve is automatically drawn by the computer through points $a_0$ and $a_1$, with start and end tangent directions $e_0$ an $e_1$, and with the peak point p, according to any suitable set of mathematical formulas.

This conic curve is already drawn when the mouse button (input device) is pressed for the peak point. When the peak point is dragged by the input mechanism, (mouse) to a new location, and the conic curve is changed, the final shape of which is drawn when the input mechanism releases the peak point.

Additional curve components of any type may be constructed connected to the original curve with $G^2$, $G^1$, or $G^0$ continuity.

The conic peak-point curves are more intuitive, predictable, and accurate to construct than conics with typical computer drawing programs, because the peak point directly determines its path.

An exemplar set of formulas for determining a conic peak-point curve is as follows:

Let $q=0.5(a_0+a_1)$ be the center of the chord. The equation for the conic is $$x(t) = \frac{(1-t)^2 b_0 + 2t(1-t)wb_1 + t^2 b_2}{(1-t)^2 + 2t(1-t)w + t^2},$$

where $b_0$, $b_1$, $b_2$ are the control points and w is the weight. The control point $b_0$ is the start point $a_0$, the control point $b_1$ is the intersection point of the start and end tangents, the control point $b_2$ is the end point $a_1$, and the weight w is the proportion between the distance of the peak point from q and the distance of the peak point from $b_1$.

The following assumptions are made:

Assume that $sign(e_0 \times (a_1-a_0))=sign(e_1 \times (a_0-a_1))=sign(e_0 \times e_1)$ (where "x" denotes the vector product between two 2-dimensional vectors) and that the peak point p lies on the guide described above.

The following formulas are provided;

$$b_0 = a_0$$

$$b_1 = a_0 + \frac{(a_1 - a_0) \times e_1}{e_0 \times e_1} e_0$$

$$b_2 = a_1$$

$$w = \frac{|p_1 - q_1|}{|p_1 - b_1|}.$$

The parameter for the peak point of a conic is always 0.5, whereas for a cubic Bezier curve this parameter can have a different value.

The concept of peak-point curve shows very clearly why the conics have a better shape than the cubic Bezier curves. The reason is that the conics are more centered, since the peak point always lies on the centerline, whereas for cubic Bezier curves the peak point can lie elsewhere than on the centerline.

Figure 7:
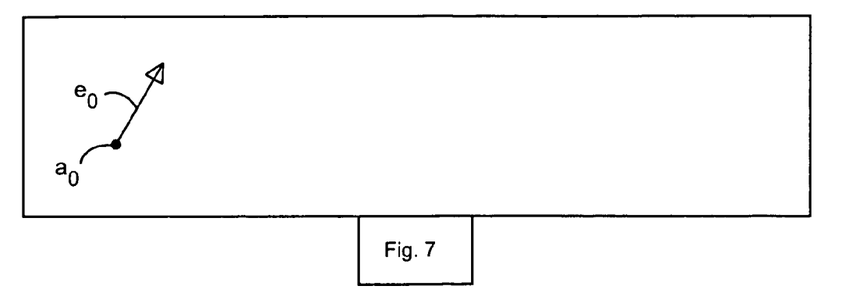
FIG. 7 is a first step in constructing a conic point-point curve.
Figure 8:
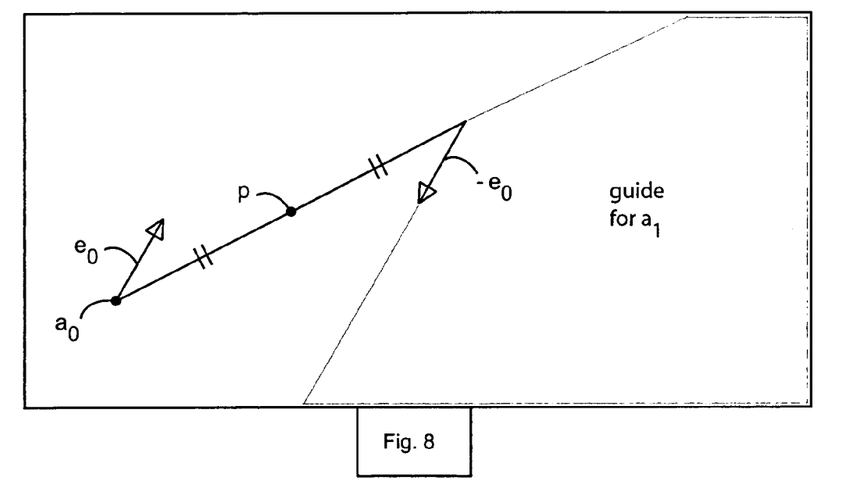
FIG. 8 is a second step in constructing a conic point-point curve.
Figure 9:
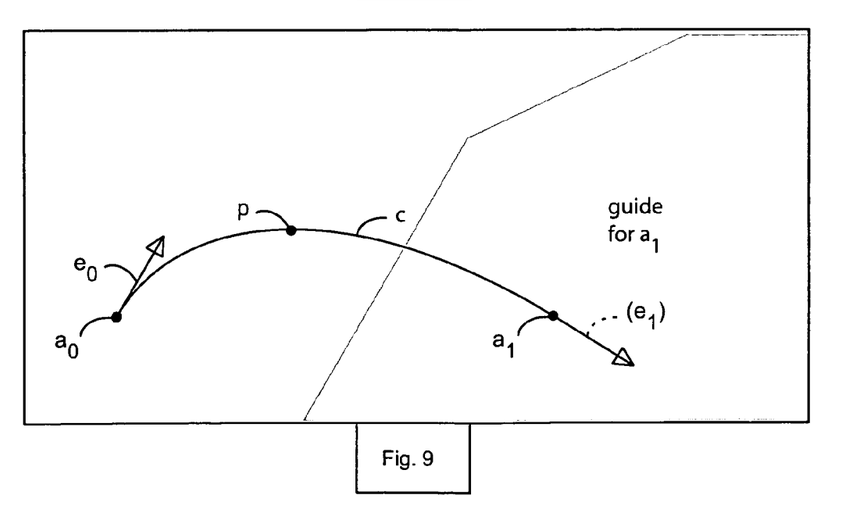
FIG. 9 is a third step in constructing a conic point-point curve.

FIGS. 7–9—Conic Point-Point Curves

As in Ananya (supra), in a first step shown in FIG. 7, a start point $a_0$, and a start tangent direction $e_0$ are set. In a second step shown in FIG. 8, a peak point p is set. Then a guide for the end point is shown. The guide uses the special point that lies on the ray starting at the start point in the direction of the peak point at twice the distance of the peak point from the start point. It is the area of the open convex polygon defined by the following two rays starting at this special point: the ray in the direction of the peak point from the start point and the ray in the opposite direction of the start tangent direction. In a third step shown in FIG. 9, the end point $a_1$ is set anywhere on this guide. A conic c is automatically drawn through points $a_0$ and $a_1$, with start tangent direction $e_0$ and peak point p, according to any suitable set of mathematical formulas. As shown in FIG. 9, for the example of conics (unlike the example of cubic Bezier curves), the end tangent direction $e_1$ is automatically determined, since the intersection point of the start and end tangents is determined. It equals the intersection point of the start tangent and the line connecting the center of the chord with the peak point.

This conic c is already drawn when the mouse button (input device) is pressed for the end point $a_1$, and when the mouse is dragged, the end point $a_1$ is dragged to a new position, and the conic c is changed, the final shape of which is drawn when the mouse is released.

Additional curve components of any type may be constructed to connect with G2, G1, or G0 continuity.

The conic point-point curves are easy to construct, because the end tangent direction of each curve component is automatically determined.

An exemplar set of formulas for determining a conic point-point curve is as follows:

The following assumption is made:

Assume that the end point a1 lies inside the guide described above.

The following formulas are provided:

Using the automatically determined end tangent direction $e_1$, the formulas for a conic point-point curve are the same as the formulas for a conic peak-point curve.

Figure 10:
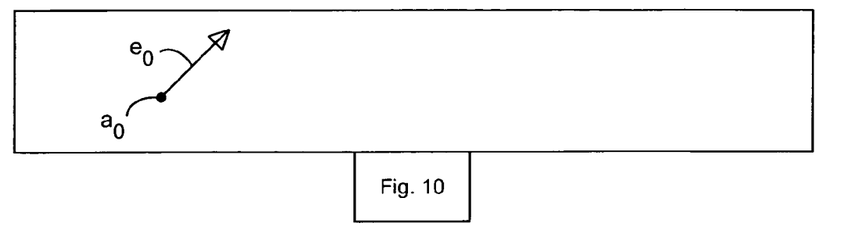
FIG. 10 is a first step in constructing a conic point-tangent curve.
Figure 11:
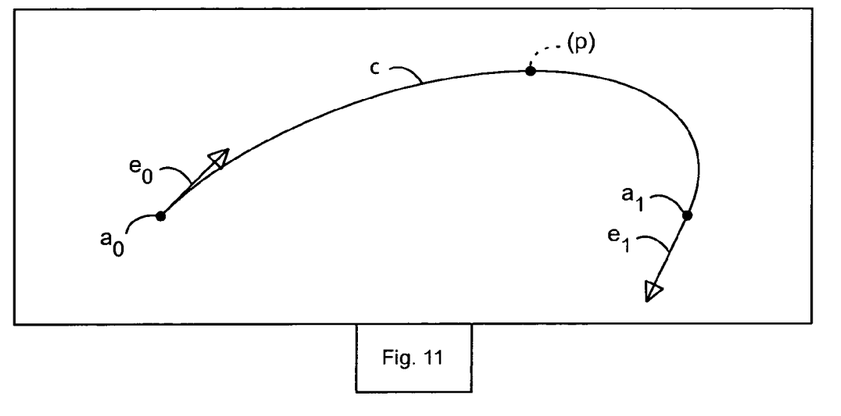
FIG. 11 is a second step in constructing a conic point-tangent curve.

FIGS. 10–11—Conic Point-Tangent Curves

As in Ananya (supra), in a first step shown in FIG. 10, a start point $a_0$ and a start tangent direction $e_0$ are set. In a second step shown in FIG. 11, an end point $a_1$ and an end tangent direction $e_1$ are set. A conic c is automatically drawn through start and end points $a_0$ and $a_1$, with start and end tangent directions $e_0$ and $e_1$, according to any suitable set of mathematical formulas.

The conic has a chosen weight w such as $w=\cos(\alpha/2)$, where a is the angle between $e_0$ and $e_1$. With this weight, if the angle between $e_0$ and the ray extending from the start point to the end point equals the angle between that ray and $e_1$, the conic is a circular arc. However, the user is allowed to choose any fixed weight or any fixed cos-weight. The cos-weight is a new concept that has not been used anywhere. If the weight is $(v)\cos(\alpha/2)$, we say that the cos-weight is v. The advantage of a fixed cos-weight is, that if the angle $\alpha$ goes toward 180 degrees, the height of the curve is still restrained, whereas for a fixed weight the height stretches toward infinity. If the weight is 1, the conic is a parabola, which means that the conic point-tangent curve is the same as the Bezier point-tangent curve described in Ananya. (supra) However, there are infinitely more possibilities for conic point-tangent curves (and also for conic point curves as described below), when choosing any weight or cos-weight.

These infinitely more possibilities for point-tangent and point curves can also be allowed for the example of cubic Bezier curves by choosing the peak point to lie on the center line segment with a chosen weight or cos-weight and computing the Bezier peak-point curve.

As shown in FIG. 11, the peak point p is automatically determined by the weight w. The proportion $\lambda$ of the distance of the peak point from the center of the chord to the total length of the center line segment which is:

$$\lambda = \frac{w}{w+1}$$

This shows where on the center line the peak point lies.

This conic c is already drawn when the mouse is dragged to the position of the end tangent direction $e_1$, and when the mouse is dragged further, the end tangent direction $e_1$ is dragged to a new position, and the conic c is changed, the final shape of which is drawn when the mouse is released.

Additional curve components of any type may be constructed to connect with $G^2$, $G^1$, or $G^0$ continuity.

The conic point-tangent curves are easy to construct, because the peak point is automatically determined.

An exemplar set of formulas for determining a conic peak-point curve is as follows:

The following assumptions are made:

Assume that $\text{sign}(e_0 \times (a_1 - a_0)) = \text{sign}(e_1 \times (a_0 - a_1)) = \text{sign}(e_0 \times e_1)$.

The following formulas are provided:

The weight w is the chosen weight or $(v)\cos(\alpha/2)$, where v is the chosen cos-weight, The proportion $\lambda$ of the distance of the peak point from the center of the chord to the total length of the centerline segment is given by:

$$\lambda = \frac{w}{w+1}$$

Everything else is determined in the same way as for the conic peak-point curves.

Figure 12:
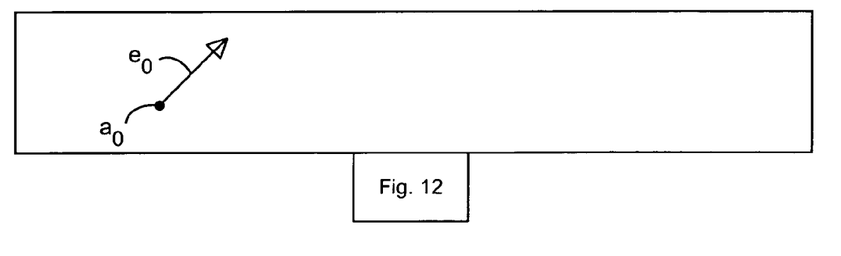
FIG. 12 is a first step in constructing a conic point curve.
Figure 13:
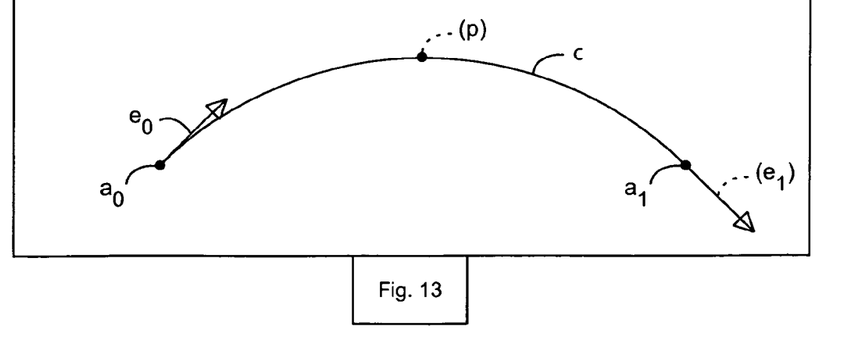
FIG. 13 is a second step in constructing a conic point curve.

FIGS. 12–13—Conic Point Curves

As in Ananya (supra), in a first step shown in FIG. 12, a start point $a_0$ and a start tangent direction $e_0$ are set. In a second step shown in FIG. 13, an end point $a_1$ is set. A conic c is automatically drawn through start and end points $a_0$ and $a_1$ with start tangent direction $e_0$, according to any suitable set of mathematical formulas. As shown in FIG. 13, an end tangent direction $e_1$ for end point $a_1$ is automatically set, for example, in a symmetric way such that the angle between the chord and the end tangent direction equals the angle between the start tangent direction and the chord.

The conic has a chosen weight w (which can be determined by a chosen cos-weight v as described for conic point-tangent curves). As shown in FIG. 13, the peak point p is automatically determined by the weight w; this computation is done in the same way as for conic point-tangent curves.

In this particular embodiment the whole curve component c is symmetric with respect to the axis that is perpendicular to the chord and goes through the center of the chord.

This conic c is already drawn when the mouse button (input device) is pressed for the end point $a_1$, and when the mouse is dragged, the end point $a_1$ is dragged to a new position, and the conic c is changed, the final shape of which is drawn when the mouse is released.

Additional curve components of any type may be constructed to connect with $G^2$, $G^1$, or $G^0$ continuity.

The conic point curves are easy to construct, because the end tangent direction and the peak point are automatically determined.

An exemplar set of formulas for determining a conic point curve is as follows:

The following assumption is made:

Assume that the angle between $e_0$ and the ray extending from $a_0$ in the direction of $a_1$ is smaller than 90°:

The following formulas are provided:

After choosing the end tangent direction $e_1$ as described above, the formulas for the conic point curve are the same as the formulas for a the conic point-tangent curve.

Figure 14:
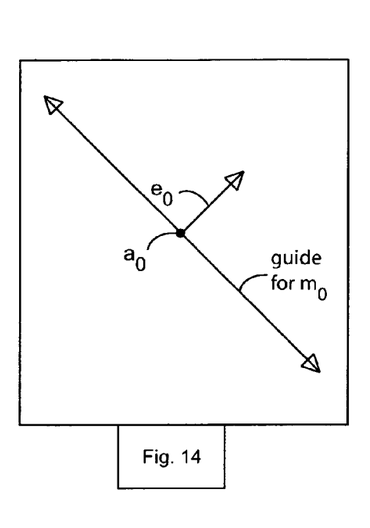
FIG. 14 is a first step in constructing a conic curvature curve.
Figure 15:
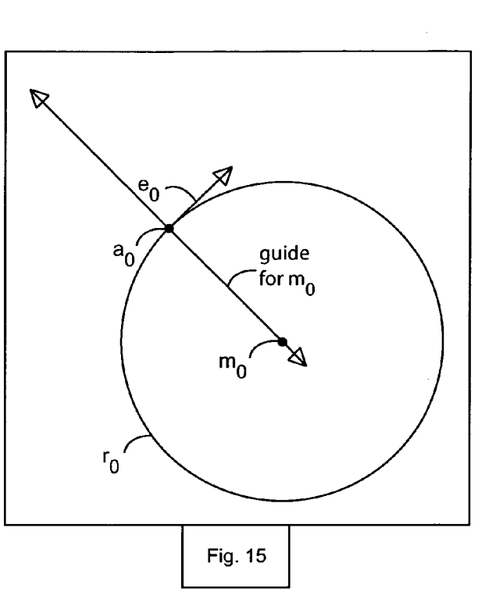
FIG. 15 is a second step in constructing a conic curvature curve.
Figure 16:
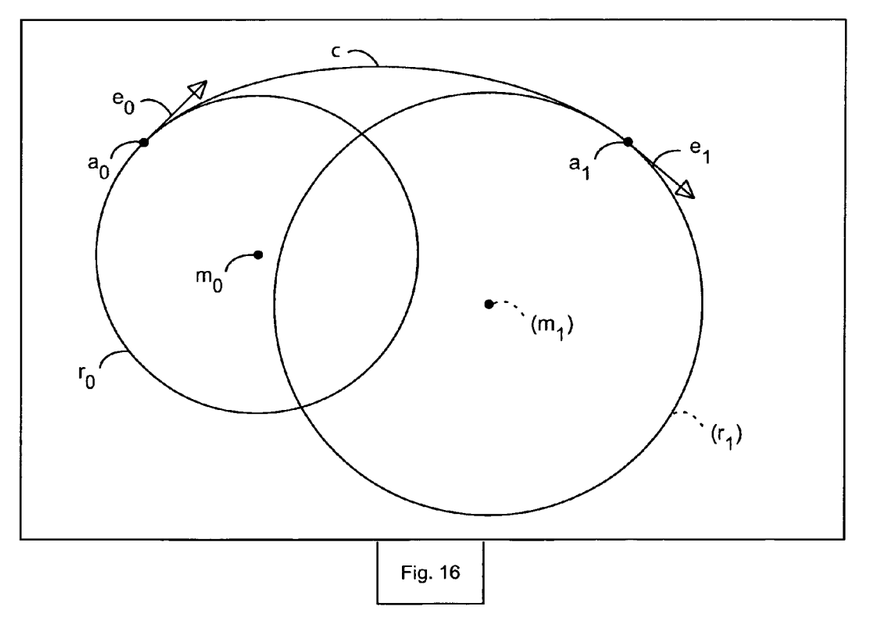
FIG. 16 is a third step in constructing a conic curvature curve.

FIGS. 14–16—Conic Curvature Curves

As in Ananya (supra), in a first step shown in FIG. 14, a start point $a_0$ and a start tangent direction $e_0$ are set, and the guide for the center of the start curvature circle (the osculating circle of the start curvature) is shown. The guide is the line through $a_0$ perpendicular to $e_0$. In a second step shown in FIG. 15, a center $m_0$ of the start curvature circle $r_0$ is set. Since it is difficult to place $m_0$ exactly on the guide, the point that is set is projected perpendicularly onto the guide. In a third step shown in FIG. 16, an end point $a_1$ and an end tangent direction $e_1$ are set. For a conic, once the start curvature is chosen, the end curvature is automatically determined. As shown in FIG. 16, a center $m_1$ of the end curvature circle $r_1$ is drawn automatically. A conic c is automatically drawn through start and end points $a_0$ and $a_1$ with start and end tangent directions $e_0$ and $e_1$ and center $m_0$ of the start curvature circle $r_0$ according to any suitable set of mathematical formulas.

This conic c is drawn when the mouse button {input device] is dragged for the end tangent direction, and when the mouse is dragged further, the end tangent direction is dragged to a new location, and the conic c is changed, the final shape of which is drawn when the mouse is released.

Additional curve components of any type may be constructed to connect with $G^2$, $G^1$, or $G^0$ continuity.

The conic curvature curves are easy to construct, because the end curvature is automatically determined. So for all additional conic curvature curves that are connected with $G^2$ continuity, no curvature has to be drawn, whereas for Bezier curvature curves that are connected with $G^2$ continuity always the end curvature has to be drawn.

An exemplar set of formulas for determining a conic curvature curve is as follows:

The equation for the conic is $$x(t) = \frac{(1-t)^2 b_0 + 2t(1-t)w b_1 + t^2 b_2}{(1-t)^2 + 2t(1-t)w + t^2},$$

where $b_0$, $b_1$, $b_2$ are the control points and w is the weight. The formulas for the start curvature $k_0$ and end curvature $k_1$ are:

$$k_0 = \frac{\text{area}(b_0, b_1, b_2)}{w^2 |b_1 - b_0|^3}$$

$$k_1 = \frac{\text{area}(b_0, b_1, b_2)}{w^2 |b_2 - b_1|^3}$$

where area($(b_0$, $b_1$, $b_2)$ is the area of the triangle formed by $b_0$, $b_1$, $b_2$.

The following assumption is made:

Assume that $\text{sign}(e_0 \times (a_1 - a_0)) = \text{sign}(e_1 \times (a_0 - a_1)) = \text{sign}(e_0 \times e_1)$ and that the end point lies on the same side of $e_0$ as the center of the start curvature circle.

The following formulas are provided:

$$b_0 = a_0$$

$$b_1 = a_0 + \frac{(a_1 - a_0) \times e_1}{e_0 \times e_1} e_0$$

$$b_2 = a_1$$

$$w = \sqrt{\frac{\text{area}(b_0, b_1, b_2)}{k_0 |b_1 - b_0|^3}}$$

$$k_1 = \frac{\text{area}(b_0, b_1, b_2)}{w^2 |b_2 - b_1|^3}$$

Figure 17:
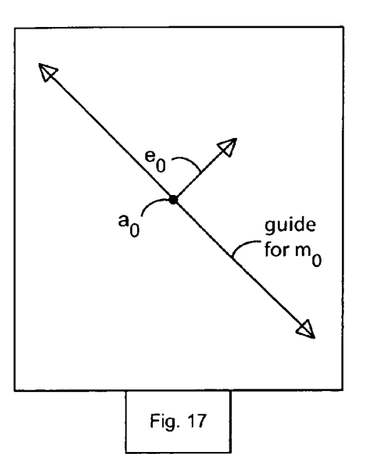
FIG. 17 is a first step in constructing a conic point-curvature curve.
Figure 18:
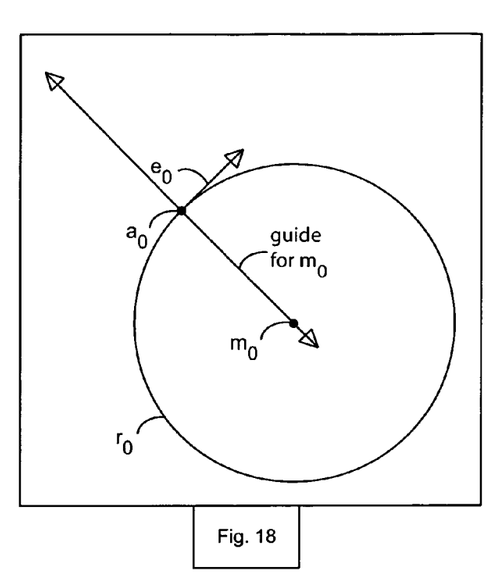
FIG. 18 is a second step in constructing a conic point-curvature curve.
Figure 19:
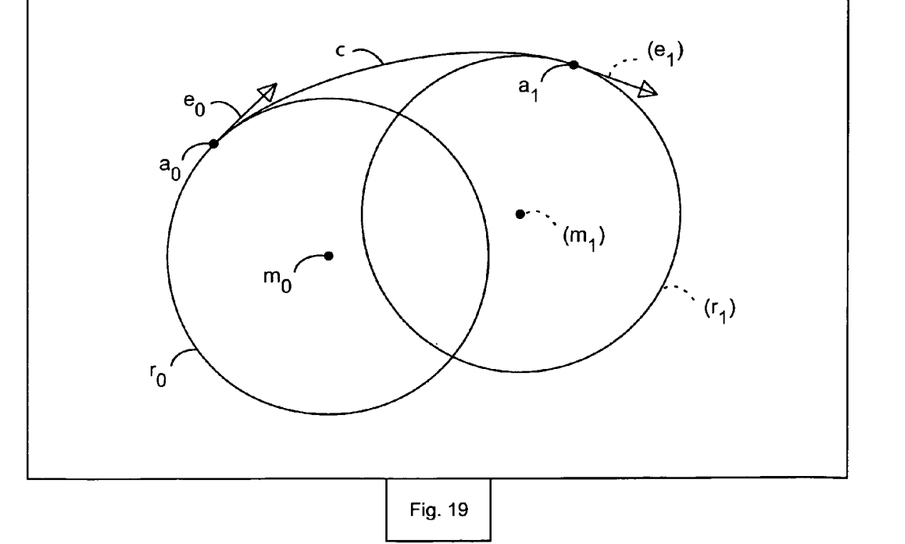
FIG. 19 is a third step in constructing a conic point-curvature curve.

FIGS. 17–19—Point-Curvature Curves

A sixth new embodiment of the Computer Curve Construction System II is for constructing point-curvature curves. In a first step shown in FIG. 17, a start point $a_0$ and a start tangent direction $e_0$ are set, and the guide for the center of the start curvature circle (the osculating circle of the start curvature) is shown. The guide is the line through $a_0$ perpendicular to $e_0$. In a second step shown in FIG. 18, a center $m_0$ of the start curvature circle $r_0$ is set. Since it is difficult to place $m_0$ exactly on the guide, the point that is set is projected perpendicularly onto the guide. In a third step shown in FIG. 19, an end point $a_1$ is set. A curve c is automatically drawn through start and end points $a_0$ and $a_1$, with start tangent direction $e_0$ and center $m_0$ of the start curvature circle $r_0$ according to any suitable set of mathematical formulas. As shown in FIG. 19, an end tangent direction $e_1$ for end point $a_1$ is automatically set, for example, in a symmetric way such that the angle between the ray extending from $a_0$ to $a_1$ and the end tangent direction equals the angle between the start tangent direction and that ray.

For the example of conics, the center $m_1$ of the end curvature circle $r_1$ is automatically determined as shown for conic curvature curves. Since the end tangent direction is chosen in a symmetric way, the end curvature of the resulting conic equals the start curvature.

For the example of cubic Bezier curves, the center $m_1$ of the end curvature circle $r_1$ is chosen in a particular way, for example in such a way that the end curvature equals the start curvature.

This curve c is already drawn when the mouse button (input device) is pressed for the end point, and when the mouse is dragged, the end point is dragged to a new location, and the curve c is changed, the final shape of which is drawn when the mouse is released.

Additional curve components of any type may be constructed to connect with $G^2$, $G^1$, or $G^0$ continuity.

The point-curvature curves are easy to construct, because the end tangent and end curvature are automatically determined. So for all additional point-curvature curves that are connected with $G^2$ continuity, no curvature has to be drawn.

An exemplar set of formulas for determining the point-curvature curve for conics is as follows:

The following assumption is made:

Assume that $\text{sign}(e_0 \times (a_1 - a_0)) = \text{sign}(e_1 \times (a_0 - a_1)) = \text{sign}(e_0 \times e_1)$ and that the end point lies on the same side of $e_0$ as the center of the start curvature circle.

After choosing the end tangent direction $e_1$ as described above, the formulas for the conic point-curvature curve are the same as the formulas for the conic curvature curve.

An exemplar set of formulas for determining the point-curvature curve for cubic Bezier curves is as follows:

The following assumption is made:

Assume that $\text{sign}(e_0 \times (a_1 - a_0)) = \text{sign}(e_1 \times (a_0 - a_1))$ and that the end point lies on the same side of $e_0$ as the center of the start curvature circle.

After choosing the end tangent direction $e_1$ and the center $m_1$ of the end curvature circle as described above, the formulas for the Bezier point-curvature curve are the same as the formulas for the Bezier curvature curve.

Modifying Types of Curve Components

Besides modifying different types as described in the Ananya (supra) it is also possible to change between cubic Bezier curves and conics.

Change from a Cubic Bezier Curve to Conics:

If the angle between the start and end tangents is smaller than 180 degrees, the resulting conic is the conic peak-point curve with the same start and end points and the same start and end tangent directions and the peak point on the center line at the same distance from the chord as the peak point of the cubic Bezier curve. If the angle between the start and end tangent is larger than or equal to 180 degrees, the cubic Bezier curve is first changed into two cubic Bezier curves which connect at the peak point of the original cubic Bezier curve. Then each Bezier curve is changed into a conic after finding its peak point, which is the point where the tangent is parallel to the chord, that can be found by using the section "Computing Points and Tangent Directions of a Cubic Bezier Curve" described in Ananya (supra).

Change from a Conic to Cubic Bezier Curves:

If the angle between the start and end tangents is smaller than 90 degrees, the resulting cubic Bezier curve is the Bezier peak-point curve with the same start and end points and the same start and end tangent directions and the same peak point. If the angle between the start and end tangents is larger than or equal to 90 degrees (it is still smaller than 180 degrees because of the assumptions for conics), the conic is first changed into two conics which connect at the peak point of the original conic. Then each conic is changed into a cubic Bezier curve after finding its peak point, which is the point where the tangent is parallel to the chord, that can be found by using the section "Computing Points and Tangent Directions of a Conic" described below.

Computing Points and Tangent Directions of a Conic

Let $b_0$, $b_1$, and $b_2$ be the control points and w the weight of a conic. For drawing a conic or for selecting a point on a conic the following algorithm is used, which is different from the deCasteljau algorithm. This algorithm is faster than making computations using the equation of the conic. It computes a number N of points and tangent directions, the number N being a power of 2 (such as N=1024). For drawing the conic, the polygonal line connecting these points is drawn. The points are not computed in the order they are drawn, but each point has an index and the points are drawn in the order of the indices. The points $p[n]$, n=0, 1, 2, . . . , N, start at the start point $p[0]=b_0$ and end at the end point $p[N]=b_2$. The tangent directions $t[n]$, n=0, 1, 2, . . ., N, start at the start tangent direction $t[0]=b_1-b_0$, and end at the end tangent direction $t[N]=b_2-b_1$. The points $p[n]$ and tangent directions $t[n]$, n=1, 2, 3, . . . , N−1 are computed by a recursive function depending on an index n, a step s, control points $c_0$, $c_1$, and $C_2$, and a weight v (for a conic which is a portion of the original conic). This recursive function also depends on the arrays p[ ] and t[ ], where it writes the results. The first time this function is called for the index N/2, the step N/2, the control points $c_0=b_0$, $c_1=b_1$, and $C_2=b_2$, and the weight v=w, and it computes the point p[N/2] and the tangent direction t[N/2]. When the function is called for the index n, the step s, the control points $c_0$, $c_1$, and $C_2$, and the weight u, it computes:

the center point $q=0.5(c_0+C_2)$,
the factor $$\lambda = \frac{v}{v+1},$$

the peak point $p[n]=q+\lambda(c_1-q)$,
and the tangent direction $t[n]=c2-c_0$.

After p[n] and t[n] are computed, if s is still larger than 1, the recursive function gets called twice for the index n−s/2, the step s/2,
the control points $c_0$, $c_0+\lambda(c_1-c_0)$, and p[n],
and the weight $u=\sqrt{0.5(v+1)}$(for the conic between $c_0$ and p[n]),
and for the index n+s/2, the step s/2,
the control points p[n], $C_2+\lambda(C_1-C_2)$, and $C_2$,
and the weight $u=\sqrt{0.5(v+1)}$. (for the conic between p[n] and $C_2$), The point p[n] and tangent direction t[n] are the point and tangent direction at the parameter t=n/N, and they are computed faster than using the equation of the original conic.

CONCLUSION

Although the above description is specific, it should not be considered as a limitation on the scope of the invention of the material describe herein, but only as an additional examples of the preferred embodiments. Many substitutes and variations are possible within the teachings of the invention, even for the particular example of conics. The mathematical formulas are only examples how the curves may be determined; any other suitable formulas may be used, even for the particular example of conics.

For the described point-curvature curves any types curves can be used and a specific description is made for the example of cubic Bezier curves conics. Also, for the embodiments of point-tangent and point curves, in addition to the example of conics, new examples of cubic Bezier curves are described.

It is also shown how conics can be converted into cubic Bezier curves that are very close, and how cubic Bezier curves can be converted into conics that a fairly close, but are chosen in such a way that allows for shape improvement. The algorithms for these conversions use the peak-point curve concept.

The invention claimed is:

1. A computer-implemented method for constructing and tangibly expressing a conic peak-point curve comprising:
   (i) selecting a start point, $a_0$ on a computer image display of an implementing computer with a computer input device of the implementing computer;
   (ii) selecting an end point, $a_1$ on the computer image display system with the computer input device;
   (iii) selecting a start tangent direction, $e_0$ on the computer image display system with the computer input device;
   (iv) selecting an end tangent direction, $e_1$ on the computer image display system with the computer input device, whereupon the computer image display system, responsive to the implementing computer, displays a centerline bisecting a chord between the start and end points $a_0$, $a_1$, extending through an intersection point r of rays extending in the start and end tangent directions $c_0$, $c_1$ respectively from the start and end points $a_0$, $a_1$;

(v) selecting a peak point, p, on the centerline where the peak point is a point on the curve that is farthest away from the chord between the start and end points $a_0$, $a_1$, whereupon the implementing computer, using any suitable mathematical formulae, constructs a conic peak-point curve passing through the start point $a_0$, the peak point p, and the end point $a_1$, with the start tangent direction $c_0$ and the end tangent direction $e_1$; and (vi) expressing tangibly the conic peak-point curve using any image display system controlled by the implementing computer.

2. A computer-implemented method for constructing and tangibly expressing a conic paint-point curve comprising:

(i) selecting a start point, $a_0$ on a computer image display system of an implementing computer with a computer input device of the implementing computer;

(ii) selecting a start tangent direction, $c_0$ on the computer image display system with the computer input device;

(iii) selecting a peak point, p, whereupon the computer image display system, responsive to the implementing computer, displays a guide area for locating possible end points loci defined by two rays intersecting at a point s that lies on one of two rays that extends from the stan point $a_0$ in the direction of the peak point p at twice (2X) the distance of the peak point p from the start point $a_0$, the remaining ray extending from s in a direction opposite to the start tangent direction $c_0$;

(iv) selecting with the computer input device any point in the guide area displayed on the computer image display system as an end point $a_1$ for a conic point-point curve, whereupon the implementing computer, using any suitable mathematical formulae constructs a conic point-point curve passing through the start point, $a_0$, peak point, p, and the end point $a_1$ with the start tangent direction $e_0$, where an end tangent direction $e_1$ is derived from a point intersection of rays extending in the start and end tangent directions $c_0$, $c_1$, which coincides with the intersection of a ray extending in the start tangent direction, $e_0$ and a centerline extending through the center of a chord between the start and end points $a_0$, $a_1$, and through the peak point, p; and (v) expressing tangibly the constructed conic point-point curve using any image display system controlled by the implementing computer.

3. A computer-implemented method for constructing and tangibly expressing a conic point-tangent curve comprising (i) selecting a start paint, $a_0$ on a computer image display system of an implementing computer with a computer input device of the implementing computer;

(ii) selecting a start tangent direction, $c_0$ on the computer image display system with the computer input device;

(iii) selecting an end point, $a_1$ on the computer image display system with the computer input device;

(iv) selecting an end tangent direction, $e_1$ on the computer image display system with the computer input device;

(v) selecting a weight, w for the curve with a computer input device of the implementing computer, whereupon the implementing computer, using any suitable mathematical formulae, constructs a conic point-tangent curve passing through the start point, $a_0$, and the end point $a_1$ with the start tangent direction $e_0$ and the end tangent direction $e_1$, where a peak point p is calculated by the weight, w, which is a parameter defining a proportion between a distance, $D_q$ of the peak point p from a center point, q of a chord between the start and end points $a_0$, $a_1$ and a distance, $D_r$ of the peak point p from an intersection point, r of rays extending in the start and end tangent directions $e_0$, $e_1$ respectively from the start and end point $a_0$, $a_1$; and (vi) expressing tangibly the constructed conic point-tangent curve using any image display system, controlled by the implementing computer.

4. The method of claim 3 wherein the selected weight w is calculated from a fixed arbitrarily defined positive number v, multiplied by $\cos(\alpha/2)$, where $\alpha$ is an angle between the start and end tangent directions $e_0$, $e_1$ extending from a common point, and the constructed curve converges to limit as $\alpha$ approaches 180°.

5. A computer-implemented method for constructing and tangibly expressing a conic point curve comprising:

(i) selecting a start point, $a_0$ on a computer image display system of an implementing computer with a computer input device of the implementing computer;

(ii) selecting a start tangent direction, $e_0$ on the computer image display system with the computer input device;

(iii) selecting an end point, $a_1$ on the computer image display system with the computer input device;

(iv) selecting a weight, w, with a computer input device of the implementing computer, whereupon the implementing computer, using any suitable mathematical formulae, constructs a conic point curve passing through the start point $a_0$ and the end point $a_1$ with the start tangent direction $e_0$, where an end tangent direction $e_1$ is set by pre-defined parameters selected with a computer input device, where a peak point p is calculated by the weight w, which is a parameter defining a proportion between a distance $D_q$ of the peak point p from a center point q of a chord between the start and end points $a_0$, $a_1$, and a distance $D_r$ of the peak point p from an intersection point r of rays extending in the start and end tangent directions $e_0$, $e_1$ respectively from the start and end point $a_0$, $a_1$; and (v) expressing tangibly the constructed conic point curve using any image display system controlled by the implementing computer.

6. The method of claim 5 wherein the selected weight w is calculated from a fixed arbitrarily defined positive number v, multiplied by $\cos(\alpha/2)$, where $\alpha$ is an angle between the start and end tangent directions $e_0$, $e_1$ extending from a common point, and the constructed curve converges to limit as $\alpha$ approaches 180°.

7. A computer-implemented method for constructing and tangibly expressing a conic curvature curve comprising (i) selecting a start point, $a_0$ on a computer image display system of an implementing computer with a computer input device of the implementing computer;

(ii) selecting a start tangent direction, $e_0$ on the computer image display system with the computer input device, whereupon the implementing computer displays a guideline perpendicular to the start tangent direction, $e_0$ on the computer image display system for a center $m_0$ of a start curvature circle, $r_0$;

(iii) selecting a center $m_0$ of the start curvature circle, $r_0$ on the displayed guideline; and (iv) selecting an end point $a_1$ on the computer image display system with the computer input device; and (v) selecting an end tangent direction, $e_1$ on the computer image display system with the computer input device, whereupon the implementing computer, using any suitable mathematical formulae, constructs a conic curvature curve through the start point $a_0$ and the end point $a_1$, with the start tangent direction $e_0$ and the end tangent direction $e_1$, with the center $m_0$ of the start curvature circle $r_0$, and a center $m_1$ for an end curvature circle $r_1$ is calculated; and (vi) expressing tangibly the constructed conic curvature curve using any image display system controlled by the implementing computer.

8. A computer-implemented method for constructing and tangibly expressing a class of point curvature curves including cubic Bezier curves and conics comprising:

(i) selecting a start point, $a_0$ on a computer image display system of an implementing computer with a computer input device of the implementing computer;

(ii) selecting a start tangent direction, $e_0$ on the computer image display system with the computer input device, whereupon the implementing computer displays a guideline perpendicular to the start tangent direction, $e_0$ for a center $m_0$ of a start curvature circle $r_0$ on the computer image display system;

(iii) selecting a center $m_0$ of a start curvature circle $r_0$ on the displayed guideline on the computer image display system with the computer input device; and (iv) selecting an end point $a_1$ on the computer image display system with the computer input device, whereupon the implementing computer, using any suitable mathematical formulae, constructs a point curvature curve passing through the start point $a_0$ and the end point $a_1$, with the start tangent direction $e_0$ and the center $m_0$ of the start curvature circle $r_0$, where an end tangent direction $e_1$ is set by pre-defined parameters selected with a computer input device; and (v) expressing tangibly the constructed point curvature curve using any image display system controlled by the implementing computer.

9. The method of claim 8 wherein the constructed curve is a conic and a center $m_1$ of an end curvature circle $r_1$ is thereby automatically determined.

10. The method of claim 8 wherein the constructed curve is a cubic Bezier curve, and a center $m_1$ of the end curvature circle $r_1$ is set by a defined parameter selected using a computer input device.

11. A computer-implemented method for constructing and tangibly expressing a Bezier point-tangent curve comprising:

(i) selecting a start point, $a_0$ on a computer image display system of an implementing computer with a computer input device of the implementing computer;

(ii) selecting a start tangent direction, $e_0$ on the computer image display system with the computer input device;

(iii) selecting an end point, $a_1$ on the computer image display system with the computer input device;

(iv) selecting an end tangent direction, $e_1$ on the computer image display system with the computer input device;

(v) selecting a weight, w with an input device of the implementing computer, whereupon the implementing computer, using any suitable mathematical formulae, constructs a Bezier point-tangent curve passing through the start point, $a_0$, and the end point $a_1$ with the start tangent direction $e_0$ and the end tangent direction $e_1$, having a peak point p calculated to lie on a centerline segment connecting a center point q of the chord between the start and end points $a_0$, $a_1$ with an intersection point, r of rays extending in the start and end tangent directions $e_0$, $e_1$ from the start and end point $a_0$, $a_1$ respectively, the weight, w specifying a proportion between a distance, $D_q$ of a peak point p from the center point q of a chord and a distance, $D_r$ of the peak point p from the intersection point, r of the start and end tangents;

(vi) expressing tangibly the constructed Bezier point-tangent curve using any image display system controlled by the implementing computer.

12. The method of claim 11 wherein the selected weight w is calculated from a fixed arbitrarily defined positive number v, multiplied by $\cos(\alpha/2)$, where $\alpha$ is an angle between the start and end tangent directions $e_0$, $e_1$ extending from a common point, and the constructed curve converges to limit as a approaches 180°.

13. A computer-implemented method for constructing and tangibly expressing a Bezier point curve comprising:

(i) selecting a start point, $a_0$ on a computer image display system of an implementing computer with a computer input device of the implementing computer;

(ii) selecting a start tangent direction $e_0$ on the computer image display system with the computer input device;

(iii) selecting an end point, $a_1$ on the computer image display system with the computer input device;

(iv) selecting a fixed weight, w, with an input device of the implementing computer, whereupon the implementing computer, using any suitable mathematical formulae, constructs a Bezier point curve passing through the start point $a_0$ with the start tangent direction $e_0$, and the end point $a_1$, where an end tangent direction $e_1$ is set by pre-defined parameters selected with an input device of the implementing computer, having a peak point p calculated to lie on a centerline segment connecting a center point q of the chord between the start and end points $a_0$, $a_1$ with an intersection point, r of rays extending in the start and end tangent directions $e_0$, $e_1$ from the start and end point $a_0$, $a_1$ respectively, the weight, w specifying a proportion between a distance, $D_q$ of a peak point p from the center point q of a chord and a distance, $D_r$ of the peak point p from the intersection point, r of the stan and end tangents; and (v) expressing tangibly the constructed Bezier point curve using any image display system controlled by the implementing computer.

14. The method of claim 13 wherein the selected weight w is calculated from a fixed arbitrarily defined positive number v, multiplied by $\cos(\alpha/2)$, where $\alpha$ is an angle between the start and end tangent directions $e_0$, $e_1$ extending from a common point, and the constructed curve converges to limit as a approaches 180°.

15. A computer-implemented method for constructing and tangibly expressing a simple point-point curve comprising:

(i) selecting a start point, $a_0$ on a computer image display system of an implementing computer with a computer input device of the implementing computer;

(ii) selecting a peak point, p on a computer image display system of an implementing computer with a computer input device, where the peak point is a point on the curve that is farthest away from the chord between the start and end paints $a_0$, $a_1$;

(iii) selecting an end point $a_1$ on a computer image display system of an implementing computer with a computer input device;

(iv) selecting a weight w for the curve with a computer input device of the implementing computer, whereupon the implementing computer, using any suitable mathematical formulae, constructs a simple point-point curve passing through the start point, $a_0$, the peak point, p, and the end point $a_1$, where, using the weight w, a point r is derived on a centerline extending from a center point, q, of a chord between die start and end points, $a_0$, $a_1$, and through the peak point, p, establishing an intersection of rays extending through the start and end points, $a_0$, $a_1$, setting start tangent and an end tangent directions, $e_0$, $e_1$; and (iv) expressing tangibly the constructed point-point curve using any image display system controlled by the implementing computer.

* * * * *